April 16, 1935. P. C. TEMPLE Re. 19,540
PRESSURE REDUCING VALVE
Original Filed Sept. 2, 1931
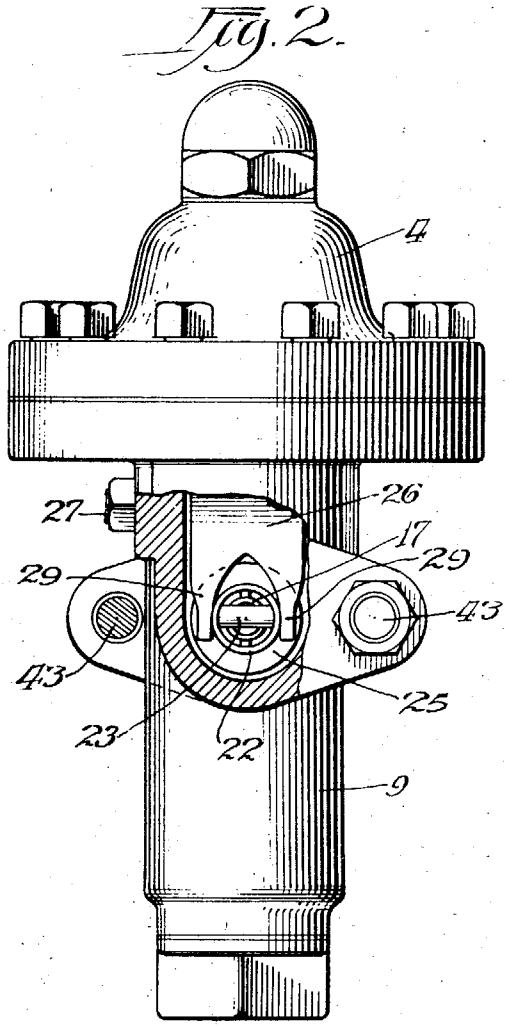
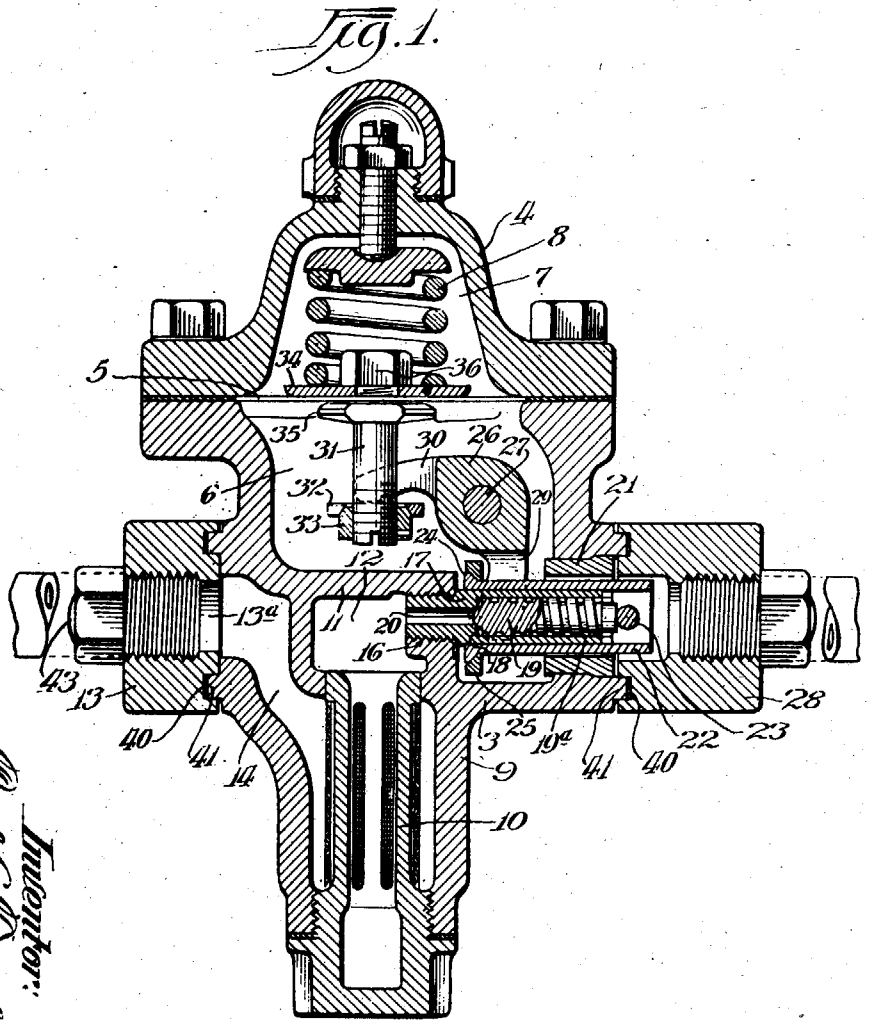
Inventor:
Paul C. Temple.
By Rector, Hibben, Davis and Massie
Attorneys.

Reissued Apr. 16, 1935 Re. 19,540

UNITED STATES PATENT OFFICE 19,540

PRESSURE REDUCING VALVE

Paul C. Temple, Decatur, Ill., assignor to A. W. Cash Company, Decatur, Ill., a corporation of Delaware Original No. 1,934,832, dated November 14, 1933, Serial No. 560,704, September 2, 1931. Application for reissue August 15, 1934, Serial No. 740,654

8 Claims. (Cl. 50—26)

My invention relates to pressure-reducing valves and the like.

Wear of the valve seat in this general type of valve due to "wiredrawing" is a serious practical difficulty, particularly when the pressure is reduced from a very high pressure to a quite low pressure as in ammonia expansion valves, for example. The cutting of the valve seat through wiredrawing is caused by the passage of the high pressure fluid at high velocity through the narrowly opened or "cracked" valve from the high pressure side to the low pressure side of the valve, resulting in impaired efficiency and reduced serviceable life of the valve. In an ordinary ammonia expansion valve, say where the pressure is reduced from 170 pounds to 20 pounds, merely by way of example, the drop in pressure across the seat is very considerable, i. e., 150 pounds in the example assumed. With such difference in pressure the valve is only cracked off its seat to produce normal flow. The cracked valve and the high differential pressure with attendant high velocities cause excessive wiredrawing and wear of the seat.

A principal object of my invention is to overcome wiredrawing and at the same time increase the efficiency of the device by eliminating the above mentioned causes of wiredrawing. To this end I provide means which permits the valve to open wide and causes but a relatively small drop in pressure across the valve seat with attendant minimum velocity. More particularly, I provide in the structure a passage for the fluid after it has passed the valve seat such that the drop in pressure and velocity are greatly reduced so as to avoid wire cutting, without, however, danger of the passage being plugged up due to any foreign matter. In my preferred form of embodiment, I provide a long tortuous groove between the body of the valve and its housing to materially resist the flow and thus attain the above mentioned advantages.

Another object of the invention is to provide a self-creeping valve (i. e., one that turns on its seat) to obtain a grinding action, which tends to prevent wear in one place, maintains the valve in tight closure condition, and enhances the efficiency and lengthens the life of the device.

Another object of my invention is to prevent liquefaction or solidification of the refrigerating gas within the low pressure side of the casing. To this end, I provide a packless valve device including a housing for the plunger valve with the housing extending from the high pressure side to the delivery opening, the operating connections for the plunger valve being outside of the housing so that no packing is necessary or leak is possible.

Still another object of my invention is to provide a novel arrangement whereby the valve may be easily and quickly removed from the line for the purpose of inspection, repair or cleansing.

Numerous other objects and advantages will be apparent as the invention is better understood from the following description, which, taken in connection with the drawing, discloses a preferred embodiment thereof.

On the drawing:

Figure 1 is a vertical longitudinal section through the valve; and

Fig. 2 is an end view with part of the casing broken away.

The valve shell or body comprises two parts or castings 3 and 4 having meeting flanges held together by bolts in the usual way. A diaphragm 5, having its edges clamped between the two castings, divides the valve body into a control pressure chamber 6 and a spring chamber 7, the latter housing the usual loading spring 8. The body part 3 has integral therewith a downward extension 9 in which is mounted the usual strainer unit 10. Within the body part 3 is a partition 11 separating the pressure control chamber 6 from a small chamber 12 above the strainer. The high pressure side of the valve includes an inlet opening 13a in a coupling 13 into which the end of the inlet pipe is screwed, the passage 14 in which the strainer is positioned and the chamber 12. Screwed into a threaded opening 16 in the partition 11 is the reduced end of a tubular valve housing 17, having a small inlet passage and an enlarged bore 18 in which slides a plunger valve 19. The end of the valve which is preferably, though not necessarily, rounded, normally engages a valve seat 20 in the housing 17. The body of the valve 19 is provided with a tortuous groove 19a which together with the housing 17 forms a closed channel or path from one end to the other. Preferably, the groove runs spirally around the plunger valve and the groove is of such width as to assist in resisting flow without danger of becoming plugged up. Slidably mounted on the valve housing 17 is a sleeve 22 carrying a pin 23 in one end and engaging the flat end of the valve 19. The sleeve 22 projects through a collar 21 mounted in an opening in the casting 3 and also projects into an opening into a coupling member 28 into which the end of the delivery pipe is screwed. A circular rib 24 on the forward end of the sleeve 22 has an inclined arcuate face which coacts with a beveled face of a ring 25. A bell crank lever 26, mounted on a stud 27, has the forks of its arm 29 straddling the sleeve 22 and pressing against the ring 25 at points on the opposite sides of the axis of the ring.

The other forked arm 30 of the lever 26 straddles a stud 31 which depends from the diaphragm 5 and carries a ring 32 coacting with a nut 33. The customary bearing plate 34 and the diaphragm 5 are clamped together between a flange 35 on the stud 31 and a nut 36 screwed on the upper reduced end of this stud.

The normal reduced pressure, that is, the pressure in the delivery line during zero demand, is such as to exert such force on the underside of the diaphragm as to keep the valve closed against the pressure exerted on the upper side of the diaphragm by the atmosphere and the spring 8 and against the pressure exerted by the high pressure fluid on the end of the valve 19 exposed to the opening 16. When the pressure in the delivery line is reduced by demand of the refrigerating or other apparatus, the pressure in the delivery line drops slightly and as the control pressure space 6 is in communication with the delivery opening through a narrow annular space 37 between the sleeve 22 and the collar 21, the pressure in the control chamber drops correspondingly. Thus the pressure load on the underside of the diaphragm is decreased and the diaphragm moves downwardly and as movement of the lever 26 is permitted the initial high pressure of fluid in the opening 16 moves the valve permitting the fluid to pass the valve seat 20, through the spiral groove 19a and out into the delivery line. As the fluid passes into the delivery line it creates a suction or aspirating effect by reason of the annular passage 37 further reducing the pressure in the control pressure space with the result that the valve is still further opened and an increased flow of fluid to the delivery pipe is permitted until the pressure in the delivery pipe builds up to normal reduced pressure and then the valve seeks and maintains a definite position so long as the demand remains normal. Should the demand continue to increase, the velocity of the fluid passing the aspirating opening will further weaken the pressure in the control pressure space and the valve would open further to a corresponding extent. As the demand falls off the pressure in the delivery pipe in the control pressure space builds up and the valve finally closes when the pressure becomes normal.

If the pressure of the fluid were greatly reduced as it passed the valve seat 20 when the valve is "cracked", its velocity at that point would be considerable with the result that the seat would be cut due to the "wiredrawing" as explained above. To prevent such reduction and velocity at that point and thus eliminate cutting of the seat, I cause the fluid, after it has passed the seat, to travel through the tortuous groove 19a, which is preferably narrow and spiral in form, and thus delay any considerable reduction in pressure until the fluid passes out of the spiral groove. Due to the friction of the fluid with the walls of the groove, the narrowness of the groove and the tortuous path which it prescribes, the groove offers great resistance against the fluid flow and thus the reduction of pressure and velocity of the fluid as it passes the valve seat is minimized so that there is no deterioration of the seat.

It will be observed that, due to the reaction of the spiral course of the fluid through the tortuous passage 19a, the plunger valve "creeps" or turns slightly on its seat each time it opens and closes. This self-grinding action prevents localized wear, keeps the seats in prime condition, and makes for tight closure over a longer period of time than otherwise would be true.

It will also be observed that the refrigerating gas does not expand until it reaches the delivery opening and that there is no material expansion of the gas in the pressure control chamber 6 or in the valve housing 17 so that the gas does not liquefy or solidify either in that chamber or the valve housing. Liquefaction or freezing causes the lubricant to congeal with consequent interference with the normal operation of the valve and the exterior becomes "frosted", which likewise impairs the efficiency. It will be particularly observed that I obtain this desirable result without the use of any packing or stuffing boxes which are troublesome, leaky and otherwise objectionable. The elimination of packing is accomplished by having the sleeve 22 extend into the delivery opening, and providing valve operating connections which operate the plunger valve without extending into the housing.

Each of the coupling members 13 and 28 has an annular groove 40 into which is fitted a flange 41 on the corresponding end of the body member 3 to center properly the valve in the line. Bolts 43 on either side of the valve project through openings in the coupling members in order to secure the coupling members and valve in assembled relation. It will be evident that when the valve is to be removed for the purposes of inspection, cleaning or repair, it is only necessary to loosen the nuts on the bolts 43, move the coupling members 13 and 28 apart to carry their grooves 40 away from the flanges 41, and then lift out the valve.

It has been found that wiredrawing occurs most when a valve is slightly cracked off its seat, because seat velocity is highest under such a condition. The valve of the instant invention is so constructed that it cannot assume a slightly cracked position. It will be apparent that this is due to the difference between the seating area of the plunger valve 19, and the area of the plunger itself, where the plunger fits into enlarged bore 18 of valve housing 17.

In operation, the valve definitely snaps open and shut. For example, when the valve is in closed position, and there is 170 lbs. pressure effective over the seating area, a slight drop in pressure in the control pressure chamber permits the valve to start opening, and instantaneously 170 lbs. pressure becomes effective over the full area of plunger 19 which causes a greater unbalanced relation between it and the diaphragm load, and because of this the valve snaps open, compelling spiral channel 19a to do all the work of pressure reduction. When the pressure desired in the control chamber is approached and the valve starts to close, as soon as it starts to throttle flow it snaps shut instantaneously, because the full inlet pressure of 170 lbs. is no longer effective over the entire area of plunger 19 and is only effective over the seating area. There is therefore, no period of cracked valve position to produce wiredrawing.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device for controlling the pressure of a refrigerant fluid, comprising a casing providing a high pressure side and a reduced pressure side, a valve device for controlling the passage of fluid from the high pressure side to the reduced pressure side and including a valve seat and a valve member co-operating therewith, and means providing a spiral flow-resisting path for the fluid after it has passed said seat to prevent wiredrawing.

2. In a device of the class described, a casing having a partition dividing the casing into a high pressure chamber and a pressure control chamber and said casing also having a delivery opening, a tubular valve housing unbroken from end to end, mounted in said partition and having a valve seat, a valve member mounted in said housing, a sleeve slidable on said housing and co-operating with said valve member, with one end of said sleeve projecting into said delivery opening and providing an aspirating passage between said delivery opening and said pressure control chamber, a pressure responsive member, and connections between said last mentioned member and said sleeve.

3. In a device of the class described, a casing having a partition dividing the casing into a high pressure side and a low pressure side, a tubular valve housing mounted in said partition and having a valve seat, a plunger valve mounted in said housing and having one end cooperating with said seat, the plunger valve having a tortuous groove forming a narrow path for the fluid after it has passed the valve seat, a sleeve slidable on said housing, means carried by the sleeve and engaging the other end of said plunger valve, a pressure responsive member and connections between said pressure responsive member and said sleeve.

4. In a device for reducing the pressure of a refrigerant fluid having a high pressure space and a delivery opening, a valve member therebetween comprising a valve at the high pressure end and a spiral groove extending from said valve to said delivery opening, whereby the pressure of the fluid flowing therethrough is gradually reduced and material expansion of the fluid is prevented.

5. In a device for reducing the pressure of a refrigerant fluid having a high pressure chamber and a delivery opening, a valve device including a valve, a valve seat, and means comprising a spiral channel extending from said valve to said delivery opening for allowing but a relatively small drop in pressure across said valve seat to prevent excess wear of said seat when the valve is opened wide.

6. In a device for reducing the pressure of a refrigerant fluid having a high pressure chamber and a reduced pressure chamber, a tubular housing between said chambers and having a valve seat therein, and a valve member in said housing comprising a valve at one end adapted to co-operate with said valve seat and a spiral passage extending from said valve to said reduced pressure chamber, whereby the pressure of the fluid on one side of said valve seat is maintained substantially equal to the pressure on the other side to prevent wiredrawing when said valve is opened.

7. In a device for reducing the pressure of a refrigerant fluid having a high pressure space and a delivery opening, a valve member therebetween comprising a valve at the high pressure end and a spiral groove extending from said valve to said delivery opening, whereby the pressure of the fluid flowing therethrough is gradually reduced and said valve member is rotated slightly by the fluid.

8. In a device for reducing the pressure of a refrigerant fluid having a high pressure chamber and a reduced pressure chamber, a tubular housing between said chamber and having a valve seat therein, and a valve member in said housing comprising a valve at one end adapted to co-operate with said valve seat and a spiral passage extending from said valve to said reduced pressure chamber, whereby the pressure on one side of said valve seat is maintained substantially equal to the pressure on the other side to prevent wiredrawing when said valve is opened, and the fluid passing therethrough causes a relative rotational movement between said seat and said valve member.

PAUL C. TEMPLE.